US011413558B1

(12) United States Patent
Das

(10) Patent No.: US 11,413,558 B1
(45) Date of Patent: Aug. 16, 2022

(54) WATER FILTRATION APPARATUS AND PROCESS

(71) Applicant: Gautham Parangusa Das, Brookline, MA (US)

(72) Inventor: Gautham Parangusa Das, Brookline, MA (US)

( * ) Notice: Subject to any disclaimer, the term of this patent is extended or adjusted under 35 U.S.C. 154(b) by 40 days.

(21) Appl. No.: 16/698,341

(22) Filed: Nov. 27, 2019

Related U.S. Application Data

(60) Provisional application No. 62/772,307, filed on Nov. 28, 2018.

(51) Int. Cl.
| | | |
|---|---|---|
| *B01D 24/00* | (2006.01) | |
| *C02F 1/00* | (2006.01) | |
| *B01D 24/10* | (2006.01) | |
| *B01D 39/04* | (2006.01) | |
| *B01D 39/06* | (2006.01) | |

(Continued)

(52) U.S. Cl.
CPC ......... *B01D 24/007* (2013.01); *B01D 24/105* (2013.01); *B01D 39/04* (2013.01); *B01D 39/06* (2013.01); *C02F 1/004* (2013.01); *B01D 2101/02* (2013.01); *B01D 2101/04* (2013.01); *C02F 2101/22* (2013.01); *C02F 2103/007* (2013.01); *C02F 2303/04* (2013.01)

(58) Field of Classification Search
CPC .... B01D 24/007; B01D 39/04; B01D 24/105; B01D 39/06; B01D 2101/02; B01D 2101/04; B01D 2101/002; C02F 1/004; C02F 2303/04; C02F 2101/22; C02F 2103/007
See application file for complete search history.

(56) References Cited

U.S. PATENT DOCUMENTS 3,327,859 A   6/1967 Pall
3,625,886 A   12/1971 Mattia
(Continued)

FOREIGN PATENT DOCUMENTS

CN   107055894 A   8/2017
CN   107253774 A   10/2017
(Continued)

OTHER PUBLICATIONS

CDC Centers for Disease Control and Prevention, Slow Sand Filtration, CDC, https://www.cdc.gov/safewater/sand-filtration.html, page last reviewed Mar. 21, 2012 (Year: 2012).*
(Continued)

*Primary Examiner* — Bradley R Spies
*Assistant Examiner* — Jeannie McDermott
(74) *Attorney, Agent, or Firm* — Adler Pollock & Sheehan P.C

(57) ABSTRACT

The instant invention, in one aspect, provides a process for decontaminating water to remove contaminants, said process comprising passing contaminated water through a filter comprising a plurality of filtering elements capable of lowering the contaminants by at least 70%. In another aspect is provides a filtering unit comprising a plurality of filtering elements arranged in individual layers, said individual layers independently selected from brick chips, hemp fibers, mixture of hemp fibers and charcoal, agave, jute fibers, sand, filter paper, and gravel.

12 Claims, 5 Drawing Sheets

(51) Int. Cl.
   *C02F 103/00* (2006.01)
   *C02F 101/22* (2006.01)

(56) References Cited

U.S. PATENT DOCUMENTS

| | | | |
|---|---|---|---|
| 4,133,754 | A | 1/1979 | Bory et al. |
| 4,664,812 | A | 5/1987 | Klein |
| 5,178,778 | A | 1/1993 | Sachse et al. |
| 5,320,663 | A | 6/1994 | Cunningham |
| 5,603,830 | A | 2/1997 | Everhart et al. |
| 5,907,925 | A | 6/1999 | Guyot |
| 5,928,588 | A | 7/1999 | Chen et al. |
| 6,821,427 | B2 | 11/2004 | Macpherson et al. |
| 6,821,433 | B2 | 11/2004 | Hokkirigawa et al. |
| 7,303,670 | B2 | 12/2007 | McPhillips |
| 8,088,279 | B2 | 1/2012 | McInnis et al. |
| 9,033,158 | B2 | 5/2015 | Yoshinobu et al. |
| 9,903,105 | B2 | 2/2018 | Tomberlin et al. |
| 2009/0050572 | A1 | 2/2009 | McGuire et al. |
| 2012/0000847 | A1 | 1/2012 | Pola |
| 2013/0087503 | A1 | 4/2013 | Youngs et al. |
| 2016/0096746 | A1 | 4/2016 | Feng |
| 2016/0107898 | A1 | 4/2016 | Parekh et al. |
| 2018/0022620 | A1 | 1/2018 | Garg |
| 2018/0237315 | A1 | 8/2018 | Jeong |

FOREIGN PATENT DOCUMENTS

| | | |
|---|---|---|
| GB | 502962 | 3/1939 |
| GB | 1082669 | 9/1967 |
| JP | 2012-170950 A | 9/2012 |
| KR | 1984-0001433 A | 5/1984 |
| KR | 89-4800 B1 | 11/1989 |
| KR | 10-1190282 B1 | 10/2012 |
| KR | 10-2013-0049909 A | 5/2013 |
| TW | 201417876 A | 5/2014 |
| WO | 97/06879 A1 | 2/1997 |

OTHER PUBLICATIONS

KAF Construction Manual, Construction, Installation and Operation of Kanchan Arsenic Fitter, CAWST, MIT, and ENPHO, http://web.mit.edu/watsan/Docs/Other%20Documents/KAF/KAF_Construction_ManuaLJan2006.pdf, accessed Jul. 7, 2021, 2006 (Year: 2006).*

Jayalath, Burnt Clay Bricks as an Alternative Filter Media for Pebble Matrix Filters (PMF), 2016, Engineer V XLIX, No. 0—p. 1-9, Institute of Engineers, Sri Lanka, 2016 (Year: 2016).*

Virginia Tech, Rapid Sand Filtration, https://web.archive.org/web/20180623105151/http://www.elaguapotable.com/WT%20-%20Rapid%20Sand%20Filtration.htm, accessed Jul. 9, 2021 10:49:23 AM, Jun. 2018 (Year: 2018).*

Environmental Engineering, Water Treatment: Capping of Sand Filters, https://web.archive.org/web/20171013014112/https://www.brainkart.com/article/Water-Treatment-Capping-of-Sand-Filters_3328/[Jul. 9, 2021 1:45:39 PM], Mar. 2016 (Year: 2016).*

Ezeokonkwo, Preparation and Evaluation of Adsorbents from Coal and Irvingiaga bonensis Seed Shell for the Removal of Cd(II) and Pb(II) Ions from Aqueous Solutions, Frontiers in Chemistry, Published online Jan. 26, 2018. doi:10.3389/fchem.2017.00132 (Year: 2018).*

Morin-Crini, Natia, et.al, Green Adsorbents for Pollutant Removal: Hemp-Based Materials for Metal Removal, Spriger, https://link.springer.com/chapter/10.1007/978-3-319-92162-4_1, Aug. 2018. (Year: 2018).*

Chargrow, Biochar vs. Charcoal vs. Activated Carbon: What They Are & How They Work—CharGrow, https://char-grow.com/biochar-vs-charcoal-vs-activated-carbon, accessed Jul. 10, 2021 (Year: 2018).*

"Car-Maker Turns to Cannabis—for Fibre", Nature, vol. 384, Nov. 14, 1996, p. 95.

Tramfloc, Inc., "More Than You Really Want To Know About Polymers", 2013, Available Online at: http://www.tramfloc.com/tf30, 15 pages.

"Straw and Wood Wattles, Granite Seed and Erosion Control", NaturesSeed, 2018, Available Online at: https://graniteseed.com/products/straw-and-wood-wattles, 4 pages.

"What is medical stone? Medical stone wholesale", Brand: MC, IS09001, 2018, Available Online at: http://www.mcreagents.com/product/59-en.html, 3 pages.

WHO. Cholera Annual Report, 2013. Geneva: 2014 Contract No. 31, vol. 89, pp. 345-356.

WHO. Cholera, Fact sheet No. 107. Geneva: 2012 Contract No. 12, Aug. 2013.

Final Office Action received in U.S. Appl. No. 14/861,781, dated Jun. 28, 2018, 13 pages.

Citterio, et al., "The Arbuscular Mycorrhizal Fungus Glomus Mosseae Induces Growth and Metal Accumulation Changes in *Cannabis sativa* L ", Chemosphere, vol. 59, Issue 1, Mar. 2005, pp. 21-29.

Daniels, et al., "Practical Leachability and Sorption Considerations for Ash Management", American Society of Civil Engineers, Geo-Congress 2014 Technical Papers, Mar. 25, 2014, pp. 362-376.

Das, "Hemp (*Cannabis sativa* L.) Filter for Removing Heavy Metals and Microbes from Water", 16 pages.

Grotenhermen, "Medical Cannabis Congresses in Germany", Conference Reports, vol. 5, No. 2, 1998, 3 pages.

Hanaor, et al., "Scalable Surface Area Characterization by Electrokinetic Analysis of Complex Anion Adsorption", Langmuir, vol. 30, No. 50, Nov. 27, 2014, pp. 15143-15152.

Kos, et al., "Induced Phytoextraction/Soil Washing of Lead Using Biodegradable Chelate and Permeable Barriers", Environ. Sci. Technol., vol. 37, No. 3, Feb. 1, 2003, pp. 624-629.

Linger, et al., "Industrial Hemp (*Cannabis sativa* L.) Growing on Heavy Metal Contaminated Soil: Fibre Quality and Phytoremediation Potential", Industrial Crops and Products, vol. 16, No. 1, Jul. 2002, pp. 33-42.

Patel, et al., "Crystallographic Characterization and Molecular Symmetry of Edestin, A Legumin From Hemp", Journal of Molecular Biology, vol. 235, Issue 1, Jan. 7, 1994, pp. 361-363.

Rausch, "Verwendung Von Hanfsameno" 1 in Der Kosmetik, Bioresource Hemp Symposium Frankfurt, 1995.

Theimer, et al., "Oils From *Cannabis sativa* L.—Valuable Food and Raw Materials for Pharmaceuticals and Other Industrial Products", Bioresource Hemp Symposium, 1997.

Wardlaw, et al., "Diarrhoea: Why Children Are Still Dying and What Can Be Done", Unicef/WHO, ISBN 978-92-806-4462-3 (UNICEF), 2009, 68 pages.

Wirtshafter, "Why Hemp seeds?", Bioresource Hemp Symposium Frankfurt, 1995.

\* cited by examiner

WATER FILTRATION APPARATUS AND PROCESS

CROSS REFERENCE TO RELATED APPLICATIONS

This application claims benefit from U.S. Provisional Patent Application Ser. No. 62/772,307, filed Nov. 28, 2018, which is incorporated by reference in its entirety.

BACKGROUND OF THE INVENTION

Waterborne pathogens, in the form of disease-causing bacteria and viruses from human and animal waste, are a major cause of illness from contaminated drinking water. Diseases spread by unsafe water include cholera, giardia, and typhoid. Releases from sewage treatment facilities, as well as runoff from farms and urban areas, contribute harmful pathogens to waterways. Thousands of people across the globe are sickened every year by Legionnaires' disease (a severe form of pneumonia contracted from water sources like cooling towers and piped water).

Chemicals and heavy metals from industrial and municipal wastewater contaminate waterways as well. These contaminants are toxic to aquatic life—most often reducing an organism's life span and ability to reproduce—and make their way up the food chain as predator eats prey.

Sewage is the primary source of pathogens (disease-causing microorganisms) and putrescible organic substances. Because pathogens are excreted in feces, all sewage from cities and towns is likely to contain pathogens of some type, potentially presenting a direct threat to public health. Putrescible organic matter presents a different sort of threat to water quality. As organics are decomposed naturally in the sewage by bacteria and other microorganisms, the dissolved oxygen content of the water is depleted. This endangers the quality of lakes and streams, where high levels of oxygen are required for fish and other aquatic organisms to survive. Sewage-treatment processes reduce the levels of pathogens and organics in wastewater, but they do not eliminate them completely (see also wastewater treatment).

Contaminated drinking water is one of a leading cause of deaths. Drinking water is often contaminated by water borne pathogens such as cholera, heavy metals such as chromium, arsenic, cadmium, thallium, etc. Soil contamination is increasing due to release of industrial effluents, municipal wastes and waste sludge enriched with heavy metals that contaminate the surrounding environment. Heavy metal contaminants are a potential threat to humans and animals for years to come. Biological decontamination methods are considered safe for removing these pollutants, particularly from water and soil.

To address the need of clean water, several water treatment plants have been setup. These plants use different techniques to rid the polluted water of contaminants and impurities. While water cleaning processes have come a long way, there is a continued need for new methods to decontaminate water on a larger scale as well as a personal level.

SUMMARY OF THE INVENTION

Figure 1:
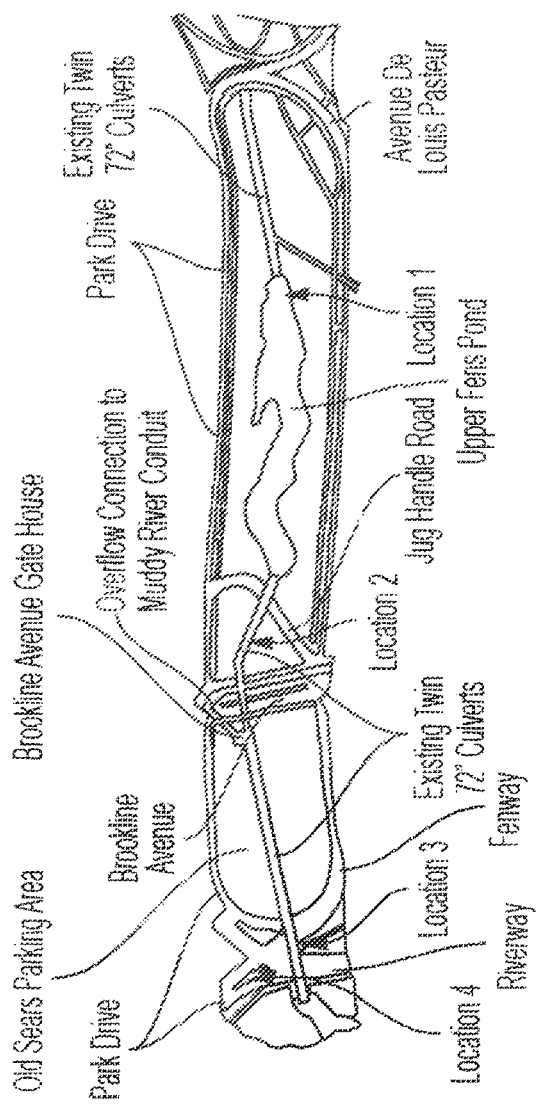
FIG. 1 shows sampling/testing locations along the Muddy River.

Considering the continued need for clean water the instant invention provides and environmentally friendly method for decontaminating water. In one aspect of the instant invention is provided a process for decontaminating water, said process comprising passing contaminated water through a filter comprising a plurality of filtering elements capable of lowering the contaminants by at least 70%.

Another aspect of the present invention provides a filtration unit comprising a plurality of filtering elements arranged in individual layers, said individual layers independently selected from brick chips, hemp fibers, mixture of hemp fibers and charcoal, agave, jute fibers, sand, filter paper, and gravel.

DETAILED DESCRIPTION OF THE INVENTION

A process for decontaminating water to remove contaminants, said process comprising passing contaminated water through a filter comprising a plurality of filtering elements capable of lowering the contaminants by at least 70%. A preferred embodiment of the present invention provides a process wherein the plurality of filtering elements are arranged in individual layers and each layer is selected from brick chips, hemp fibers, mixture of hemp fibers and charcoal, agave, jute fibers, sand, filter paper, and gravel. Yet another embodiment of the present invention claims a process wherein the filtering elements are contained within a filtering unit.

A preferred embodiment provides a process wherein the filtering unit has a diffuser section comprising a first layer of brick chips, and a second layer selected from hemp fibers and a mixture of hemp fibers and charcoal. A preferred second layer is a mixture of hemp fibers and charcoal. Yet another preferred embodiment provides a unit further comprising independent layers selected from fine sand, coarse sand, jute fibers, filter paper, charcoal, and gravel. A further preferred embodiment provides a filtering unit wherein the further independent layers are selected from fine sand, coarse sand, and gravel.

Provided in another preferred embodiment is a filtering unit comprising sequential layers of brick chips and a mixture of hemp fibers and charcoal contained within the diffuser section followed by individual layers of fine sand, coarse sand, and gravel. A preferred aspect of this embodiment provides a process wherein the ratio of the thickness of the brick chips to the mixture of hemp fibers and charcoal ranges from about 1:5 to 1:2. A further preferred embodiment provides a ratio of the thickness of brick chips to the mixture of hemp fibers and charcoal is selected from 1:2.5, 1:2.8, 1:3.0, 1:3.2, 1:3.4, 1:3.5, 1:3.6 and 1:4. Provided in yet another preferred embodiment is a process wherein the ratio of fine sand, coarse sand, and gravel is about 1:1:1, in particular the ratio of brick chips to fine sand to coarse sand to gravel is about 1:1:1:1.

Another preferred embodiment provides a process wherein the hemp charcoal mixture layer is at least three times thicker than each of the brick, fine sand, coarse sand, and gravel layers. A further preferred embodiment provides a process wherein the contaminants are selected from heavy metals, microbes, bacteria, turbidity, and coliforms. A further preferred embodiment provides a process wherein, (a) the heavy metals are selected from Cadmium, lead, Mercury, Arsenic, Chromium, and Thallium; and (b) the coliforms are selected from total coliforms, fecal coliforms, and E-coli coliforms.

A particularly preferred embodiment provides a process wherein the contaminated water is decontaminated by removing at least 95% of the heavy metal contaminants, 70% of the coliforms, and 80% of the microbes and bacteria from the contaminated water. A further particularly preferred embodiment provides a process wherein the process removes at least 98% each of the heavy metals, and E-coli coliforms.

Another aspect of the present invention provides a filtering unit comprising a plurality of filtering elements arranged in individual layers, said individual layers independently selected from brick chips, hemp fibers, mixture of hemp fibers and charcoal, agave, jute fibers, sand, filter paper, and gravel. A preferred embodiment of this aspect provides a filtering unit comprising a plurality of filtering elements arranged in individual layers and selected from brick chips, hemp fibers, mixture of hemp fibers and charcoal, agave, jute fibers, sand, filter paper, and gravel.

A preferred embodiment provides a filtering unit wherein the filtering unit has a diffuser section comprising a first layer of brick chips, and a second layer selected from hemp fibers and a mixture of hemp fibers and charcoal. A further preferred embodiment provides a filtering unit of wherein the second layer is a mixture of hemp fibers and charcoal. Yet another preferred embodiment provides a filtering unit wherein the filtering unit further comprises independent layers selected from fine sand, coarse sand, jute fibers, filter paper, charcoal, and gravel. A further preferred embodiment provides a filtering unit wherein the filtering unit wherein the further independent layers are selected from fine sand, coarse sand, and gravel.

Another embodiment of the present invention provides a filtering unit wherein the filtering unit comprises sequential layers of brick chips and a mixture of hemp fibers and charcoal contained within the diffuser section followed by individual layers of fine sand, coarse sand, and gravel outside the diffuser section.

A further preferred embodiment provides a filtering unit wherein the ratio of the thickness of the brick chips to the mixture of hemp fibers and charcoal ranges from about 1:5 to 1:2. An even further preferred embodiment provides a filtering unit wherein the ratio of the thickness of brick chips to the mixture of hemp fibers and charcoal is selected from 1:2.5, 1:2.8, 1:3.0, 1:3.2, 1:3.4, 1:3.5, 1:3.6 and 1:4. Another embodiment provides a filtering unit wherein the ratio of fine sand, coarse sand, and gravel is about 1:1:1. A preferred embodiment of this aspect provides a filtering unit wherein the ratio of brick chips to fine sand to coarse sand to gravel is about 1:1:1:1.

Another embodiment provides a filtering unit wherein the hemp charcoal mixture layer is at least three times thicker than each of the brick, fine sand, coarse sand, and gravel layers.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the certain specific methods and materials are described. As used herein, each of the following terms has the meaning associated with it in this section and as described elsewhere in this specification.

"About" as used herein when referring to a measurable value such as an amount, a temporal duration, and the like, is meant to encompass variations of ±20% or ±10%, more advantageously ±5%, even more advantageously ±1%, and still more advantageously ±0.1% from the specified value, as such variations are appropriate to perform the disclosed methods.

As used herein, the term "contaminant" refers to an undesirable substance that is present in water. A contaminant is thus a physical, chemical, biological or radiological substance or matter in water. Drinking water may reasonably be expected to contain at least small amounts of some contaminants. As used herein contaminants refer to substances present in water that are harmful if consumed at certain levels in drinking water.

The term "filtering element" as used herein refers to a filter medium that can have a complex structure and can separate solid matter and fluid from a liquid mixture that passes through it. Illustrative examples of filtering medium are charcoal, sand, granite, plant based material, hemp, jute, agave, gravel, brick, sand stone, and the like.

The term "heavy metals" refers to metallic chemical elements that have a relatively high density and is toxic/poisonous at low concentrations. Examples of heavy metals include Mercury (Hg), Cadmium (Cd), Arsenic (As), Chromium (Cr), Thallium (Tl) and Lead (Pb).

The term "microbes" represents a microscopic organism which may exist in a single-celled form or in a colony of cells. Illustrative examples of microorganisms include bacteria, protozoa, fungi, algae, amoebas, and slime molds.

The term "coliform" is interchangeably used with the term "choliforms" and represents rod-shaped gram-negative non-spore forming and motile or non-motile bacteria. Coliforms includes total coliforms, fecal coliforms and *E. coli* coliforms and can be found in the aquatic environment, in soil and on vegetation. They are universally present in large numbers in the feces of warm blooded animals. Total coliform, fecal coliform, and *E. coli* are all indicators of drinking water quality. The total coliform group is a large collection of different kinds of bacteria. Fecal coliforms are types of total coliform that mostly exist in feces. *E. coli* is a sub-group of fecal coliform. Fecal coliform bacteria are a sub-group of total coliform bacteria. They appear in great quantities in the intestines and feces of people and animals. The presence of fecal coliform in a drinking water sample often indicates recent fecal contamination, meaning that there is a greater risk that pathogens are present than if only total coliform bacteria is detected. *E. coli* is a sub-group of the fecal coliform group. The presence of *E. coli* in a drinking water sample almost always indicates recent fecal contamination, meaning there is a greater risk that pathogens are present.

The term "turbidity" is intended to describe the cloudiness or haziness of a fluid caused by large numbers of individual particles that are generally invisible to the naked eye, similar to smoke in the air. The measurement of turbidity is a key test of water quality. Turbidity is a measure of the degree to which the water loses its transparency due to the presence of suspended particles. The more the total suspended particles in the water, the murkier it seems and higher the turbidity. The World Health Organization has established that the turbidity of drinking water should be below 5NTU and preferably below 1 NTU.

The term "BOD" is a short form for Biological Oxygen Demand. A lower BOD value signifies lower level of water contamination by microbes, microorganisms, fungi, coliforms, bacteria, viruses, and the like.

Experimental Details

The invention is now described with reference to the following Examples. These Examples are provided for the purpose of illustration only and the invention should in no way be construed as being limited to these Examples, but rather should be construed to encompass any and all variations which become evident as a result of the teaching provided herein. The locations are shown in FIG. 1.

After all locations were initially tested for various water quality parameters, it was identified that location 2 was the most polluted location. An additional 10 gallons were taken from location 2 to be used in the filtration assessment. The filtered sample was then tested for water quality parameters such as BOD, turbidity, coliforms, and concentrations of heavy metals.

Water samples used in all testing were taken from the Muddy River in Boston Mass. Two gallons were withdrawn from four locations along the river including the end of the river where it is dammed prior to the Charles River. These sampling locations were based on the recommendations from a consulting firm working with the researchers.

Hemp seeds were purchased through an online store and upon arrival it was identified that the seeds were in oily texture. To evaluate the initial conditions of the hemp seeds, a moisture content test was conducted in accordance to ASTM D 2216-10. Sample tests were done in triplicate and it was determined that the initial moisture content was 3.31%. Due to the oily nature of the hemp seeds, to conduct the batch and column tests the hemp seeds were airdried for 24 hours with an approximate room temperature of 25° C.

To maintain the uniform size of the hemp seeds, the seeds were sieved in the lab. The hemp seeds were passing through the number 4 sieve and retained on number 5 sieve. Two heavy metals (cadmium and chromium) were selected as the contaminants in the research program. Table 1 indicates the oxidation states and the concentrations of the selected contaminants.

Table 1 indicates the oxidation states and the concentrations of the selected contaminants.

TABLE 1

Constituents and properties.

| Constituent | Chemical Symbol | Common oxidation state(s) | Common aqueous metal complexes | AAS stock solution used in preparation (1000 mg/L) | Concentration Range tested (mg/L) |
|---|---|---|---|---|---|
| Cadmium | Cd | +2 | $Cd_{2+}$ | $Cd(NO_3)_2$ | 0.5, 1.0, 5.0 |
| Chromium | Cr | +6, +3 | $(CrO_4)^{-2}$, $Cr^{+3}$ | $K_2Cr_2O_7$ | 0.5, 1.0, 5.0 |

Column Testing of Hemp Seeds

Column testing was conducted in accordance to ASTM D 1557 and the dry density for the hemp seeds was determined to be 5.1 kN/m$^3$. This density was achieved by hand tamping the required amount into the column with a rod. It was determined that the volume occupied by hemp seed is 2059 mL and the mass of hemp seed was 1184.38g so, each column has seed density of 0.58 g/mL which is approximately 5.099 kN/m$^3$. The hemp seed was compacted in three layers. The columns were PVC tubes that had an inner diameter of 10.16 cm and a length of 23 cm. The top and bottom plates were made of PVC, it was necessary to use inert materials for the construction of the columns as it was necessary to prevent adsorption of the metals. A porous stone was placed at the top and bottom of the plates to distribute the flow and to prevent particle migration. The columns were fitted to the plates using '0' rings and silicone beads as a sealant. Threaded rods with wing nuts were used to fit the plates to the columns. The solution was delivered to the columns through ¼" flexible tubing.

Figure 2:
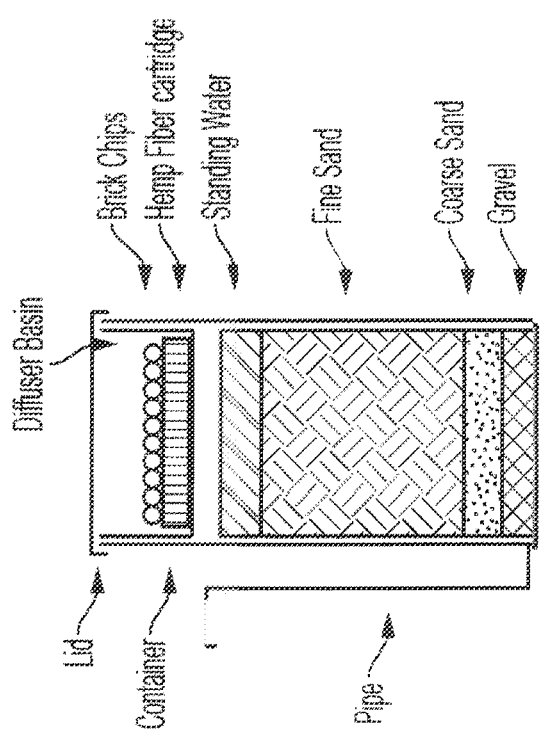
FIG. 2 shows the column water filtration unit with multiple filtration layers.

Column testing for water filter was conducted using column water filter constructed similar to the one described for hemp seeds only. The column filter consisted of 3 cm of brick chips, 10 cm of hemp seeds with charcoal, 3 cm of fine sand, 3 cm of coarse sand and 4 cm of gravel as shown in schematic of water filter—FIG. 2.

Water Testing Results

Treatment was assessed by comparing influent and effluent BOD, turbidity, coliforms, and concentrations of heavy metals including arsenic, lead and selenium. Results indicated a significant decrease in the level of contamination after ultrafiltration.

BOD Testing Results for the four locations without filtration ranged between 10 to 20 mg/L whereas the filtered sample ranged from 0.9 to 4.05 mg/L, as shown in Tables 2 and 3.

TABLE 2

Unfiltered Muddy River Water - Biological Oxygen Demand (BOD)

| Location | Day 1 | Day 2 | Day 3 | Day 5 |
|---|---|---|---|---|
| 1 | 4.50 | 12.75 | 12.75 | 12.75 |
| 2 | 10.50 | 15.00 | 15.75 | 20.25 |
| 3 | 5.25 | 15.00 | 16.50 | 12.75 |
| 4 | 5.25 | 12.75 | 15.75 | 13.50 |

TABLE 3

Filtered Muddy River Water - Biological Oxygen Demand (BOD)

| Location | Day 1 | Day 2 | Day 3 | Day 5 |
|---|---|---|---|---|
| 1 | 0.90 | 2.55 | 2.55 | 2.55 |
| 2 | 2.10 | 3.00 | 3.15 | 4.05 |
| 3 | 1.05 | 3.00 | 3.30 | 2.55 |
| 4 | 1.05 | 2.55 | 3.15 | 2.70 |

Figure 3:
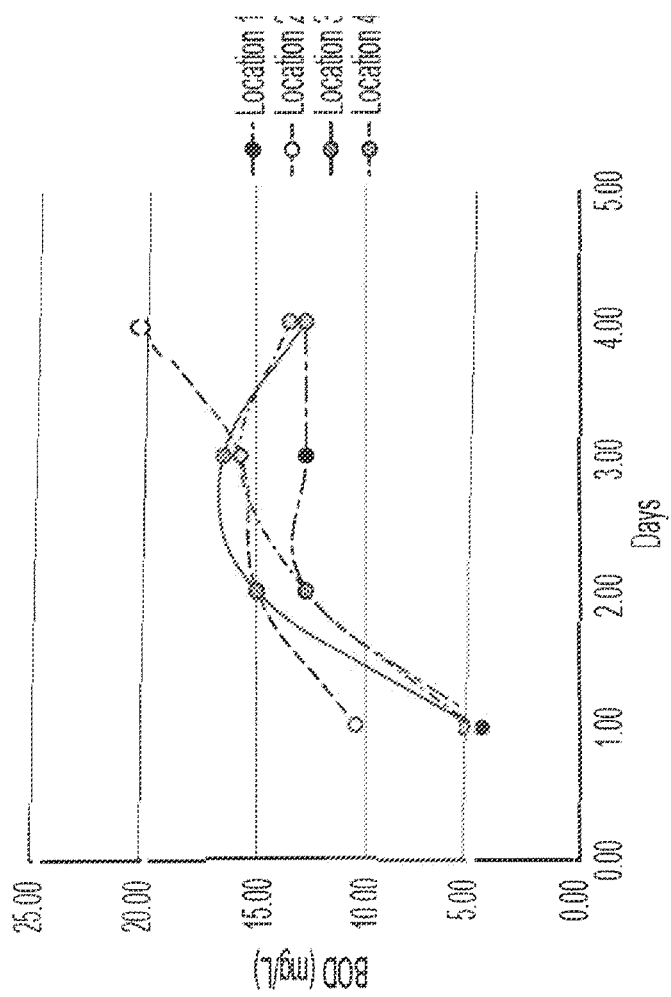
FIG. 3 depicts the Biological Oxygen Demand (BOD) for unfiltered water samples collected along the Muddy River locations.
Figure 4:
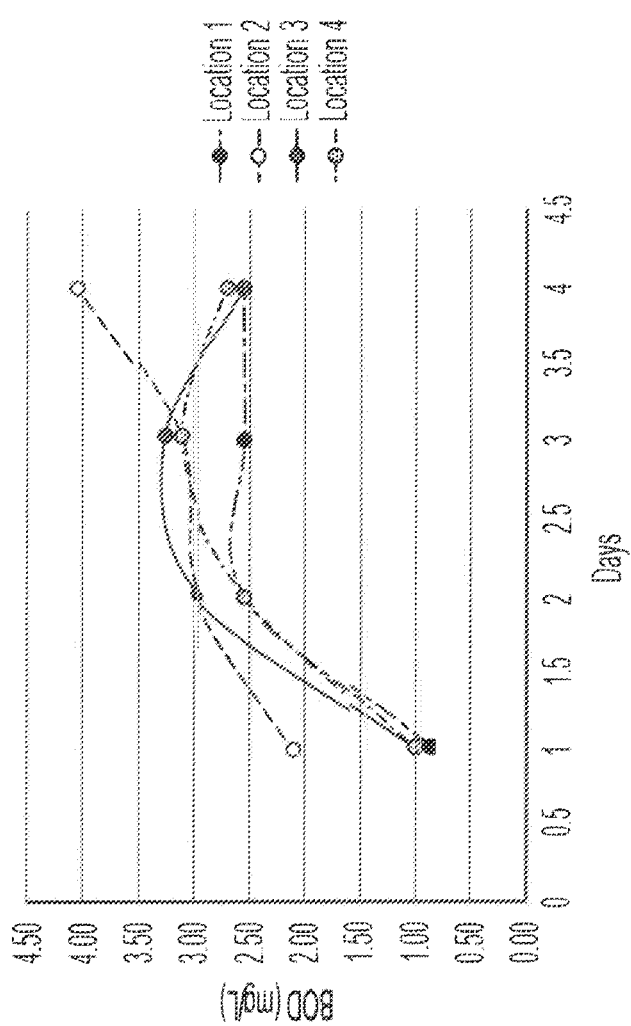
FIG. 4 depicts the Biological Oxygen Demand (BOD) for filtered water samples listed in FIG. 3.

These results show that before filtration, the river had a high level of aerobic biological organisms which consistently consumed the oxygen within the sample while the filtered sample did not have the same quantity of aerobic biological organisms, as shown in FIGS. 3 and 4. The level of oxygen consumption in the filtered samples was low and below drinking water standards of 5 mg/L (US EPA, 2009). The higher levels of BOD in the stream at location 2 could be attributed to the outfall sewer which is about 1500 ft away.

Coliform Testing Results

Unfiltered (undiluted and diluted) and filtered samples were tested for colony forming units (CFUs) for total coliforms, fecal coliforms and *E. coli*. The CFU counts are included in Tables 4 and 5. Approximately 1,000 total coliform colonies were observed after a 24-hour incubation period for the unfiltered water for undiluted and a dilution of 90% distilled water and 10% unfiltered Muddy River water.

Figure 5:
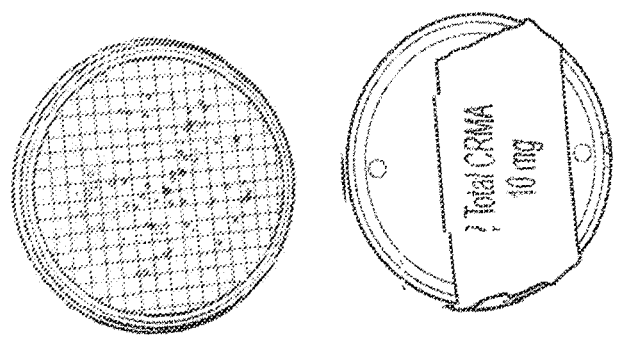
FIG. 5 demonstrates the lack of fecal coliforms observed in the filtered samples.
Figure 5:
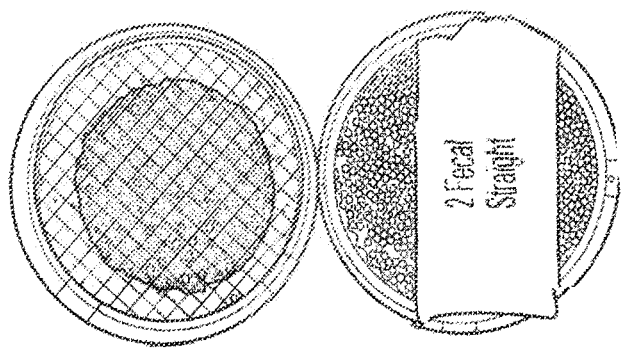

An average of 5 total coliform colonies were observed for filtered water, the Hemp Filter effectively removed 99.5% of the total coliforms. This is a log reduction value of 2, compared to the cited log reduction value of greater than 4 log removal from the Hemp Filter manual. There were no fecal coliforms were observed in the filtered samples, the Hemp Filter effectively removing the fecal coliforms, as shown in FIG. 5.

TABLE 4

Unfiltered Muddy River Water-Undiluted Samples

| Location | Total Coliforms (CFU) | Fecal Coliforms (CFU) | E. coli Colonies (CFU) |
| --- | --- | --- | --- |
| 1 | >500 | >500 | >500 |
| 2 | >500 | >500 | >500 |
| 3 | >500 | >500 | >500 |
| 4 | >500 | >500 | >500 |

TABLE 5

Unfiltered Muddy River Water- Diluted Samples

| Location | Total Coliforms (CFU) | Fecal Coliforms (CFU) | E. coli Colonies (CFU) |
| --- | --- | --- | --- |
| 1 | 139 | 64 | 1 |
| 2 | 76 | 93 | 7 |
| 3 | 109 | 81 | 0 |
| 4 | 104 | 58 | 1 |

TABLE 6

Muddy River Water from Location 2 - Undiluted Samples filtered using the instant filtering unit

| Day | Total Coliforms (CFU) | Fecal Coliforms (CFU) | E. coli Colonies (CFU) |
| --- | --- | --- | --- |
| 1 | 5 | 0 | 0 |
| 2 | 20 | 0 | 0 |
| 3 | 17 | 0 | 0 |

Turbidity Testing Results

The turbidity for the Muddy River locations prior to filtration averaged between 5.02 and 7.25 NTU, as listed in Table 7. These values indicate a high level of suspended solids within the samples. The filtered water, shown in Table 8, measured an average of 0.6 NTU indicating suspended solids were removed during filtration.

TABLE 7

Unfiltered Muddy River Water

| Location | Test 1 (NTU) | Test 2 (NTU) | Average (NTU) |
| --- | --- | --- | --- |
| 1 | 4.81 | 5.79 | 5.30 |
| 2 | 6.15 | 7.46 | 6.81 |

TABLE 7-continued

Unfiltered Muddy River Water

| Location | Test 1 (NTU) | Test 2 (NTU) | Average (NTU) |
| --- | --- | --- | --- |
| 3 | 6.08 | 8.41 | 7.25 |
| 4 | 5.74 | 4.29 | 5.02 |

TABLE 8

Muddy River Water from Location 2 filtered using the instant process and unit filtering

| Sample | Test 1 (NTU) | Test 2 (NTU) | Test 3 (NTU) | Test 4 (NTU) | Average (NTU) |
| --- | --- | --- | --- | --- | --- |
| 1 | 0.41 | 0.2 | 0.27 | 0.32 | 0.60 |

The different readings showing the lowering of the heavy metals, microorganisms, coliforms, turbidity, and other contaminants demonstrate the utility of the instantly claimed filtering process as well as the filtering unit.

The invention claimed is:

1. A process for decontaminating water to remove contaminants, said process comprising:
passing contaminated water through a filter comprising a plurality of filtering elements capable of lowering the contaminants by at least 70%;
wherein the plurality of filtering elements are contained within a filtering unit,
the filtering unit comprising a diffuser section having a first layer of brick chips and a second layer of mixture of hemp fibers and charcoal, and
the filtering unit comprising a plurality of independent layers, the plurality of independent layers having at least one of fine sand, coarse sand, jute fibers, filter paper, charcoal, and gravel.

2. The process of claim 1 wherein the plurality of filtering elements are arranged in individual layers and each individual layer is selected from the group consisting of brick chips, hemp fibers, mixture of hemp fibers and charcoal, agave, jute fibers, sand, filter paper, and gravel.

3. The process of claim 2 wherein the filtering unit comprises sequential layers of brick chips and mixture of hemp fibers and charcoal contained within the diffuser section followed by independent layers of fine sand, coarse sand, and gravel.

4. The process of claim 3 wherein the ratio of the thickness of the brick chips to the mixture of hemp fibers and charcoal ranges from about 1:5 to 1:2.

5. The process of claim 4 wherein the ratio of the thickness of the brick chips to the mixture of hemp fibers and charcoal is selected from 1:2.5, 1:2.8, 1:3.0, 1:3.2, 1:3.4, 1:3.5, 1:3.6 and 1:4.

6. The process of claim 3 wherein the ratio of the fine sand, the coarse sand, and the gravel is about 1:1:1.

7. The process of claim 3 wherein the ratio of the brick chips to the fine sand to the coarse sand to the gravel is about 1:1:1:1.

8. The process of claim 1 wherein the hemp and charcoal mixture layer is at least three times thicker than each of the brick chips, the fine sand, the coarse sand, and the gravel layers.

9. The process of claim 1 wherein the contaminants are selected from heavy metals, microbes, bacteria, turbidity, and coliforms.

10. The process of claim 9 wherein:
(a) the heavy metals are selected from cadmium, lead, mercury, arsenic, chromium, and thallium; and
(b) the coliforms are selected from total coliforms, fecal coliforms, and E-coli coliforms.

11. The process of claim 10 wherein the contaminated water is decontaminated by removing at least 95% of the heavy metal contaminants, 70% of the coliforms, and 80% of the microbes and bacteria from the contaminated water.

12. The process of claim 10 wherein the process removes at least 98% of each of the heavy metals and E-coli coliforms.

* * * * *